(12) United States Patent
Emmerling et al.

(10) Patent No.: US 7,637,405 B2
(45) Date of Patent: Dec. 29, 2009

(54) FIXING DEVICE FOR FASTENING A ROOF BOX

(75) Inventors: Alexander Emmerling, Sulzbuerg (DE); Guenther Fritsche, Postbauer-Heng (DE)

(73) Assignee: Thule Sweden AB, Hillerstorp (SE)

( * ) Notice: Subject to any disclaimer, the term of this patent is extended or adjusted under 35 U.S.C. 154(b) by 398 days.

(21) Appl. No.: 11/632,743

(22) PCT Filed: Jul. 7, 2005

(86) PCT No.: PCT/DE2005/001194

§ 371 (c)(1),
(2), (4) Date: Jan. 18, 2007

(87) PCT Pub. No.: WO2006/007813

PCT Pub. Date: Jan. 26, 2006

(65) Prior Publication Data

US 2008/0034561 A1 Feb. 14, 2008

(30) Foreign Application Priority Data

Jul. 20, 2004 (DE) ...................... 10 2004 035 154

(51) Int. Cl.
*B60R 9/058* (2006.01)
(52) U.S. Cl. ................... 224/319; 224/330; 224/331
(58) Field of Classification Search .................. None
See application file for complete search history.

(56) References Cited

U.S. PATENT DOCUMENTS

| | | | | |
|---|---|---|---|---|
| 1,351,493 A | * | 8/1920 | Sigmond .................... 294/106 |
| 2,543,017 A | * | 2/1951 | Hagan ........................ 294/106 |
| 3,902,614 A | * | 9/1975 | Roberts et al. .............. 414/735 |
| 4,563,109 A | * | 1/1986 | Ortemond ................ 405/195.1 |
| 5,275,320 A | * | 1/1994 | Duemmler ................... 224/319 |
| 5,419,479 A | * | 5/1995 | Evels et al. .................. 224/321 |
| 6,296,161 B1 | * | 10/2001 | Van der Feen et al. ...... 224/319 |
| 6,409,063 B1 | * | 6/2002 | Kmita et al. ................. 224/321 |
| 6,766,929 B2 | * | 7/2004 | Karlsson ..................... 224/319 |
| 6,918,521 B2 | * | 7/2005 | Settelmayer et al. ........ 224/319 |
| 7,419,074 B2 | * | 9/2008 | Kamiya et al. .............. 224/321 |
| 7,503,470 B2 | * | 3/2009 | Settelmayer et al. ........ 224/319 |

FOREIGN PATENT DOCUMENTS

| | | |
|---|---|---|
| DE | 11 89 323 | 3/1965 |
| DE | 40 07 263 | 9/1990 |
| DE | 92 14 916.2 | 12/1993 |
| EP | 0 777 057 | 6/1997 |
| EP | 0 983 903 | 3/2000 |
| EP | 1 338 474 | 8/2003 |

* cited by examiner

*Primary Examiner*—Jack W. Lavinder
(74) *Attorney, Agent, or Firm*—Jordan and Hamburg LLP

(57) ABSTRACT

A fixing device for fastening a roof box to crossbars fastened to a vehicle roof includes two-armed clamping jaws that extend through the bottom of the roof box and can be braced, the clamping jaws being mounted on a support base fixed in the interior of the roof box in a manner so as to pivot about a stationary swivel axis and interior end sections of the clamping jaws rest against a stop element which is vertically displaced by rotating an actuating element in order to move the clamping jaws between a locked and an unlocked position by a pure swivel motion.

15 Claims, 4 Drawing Sheets

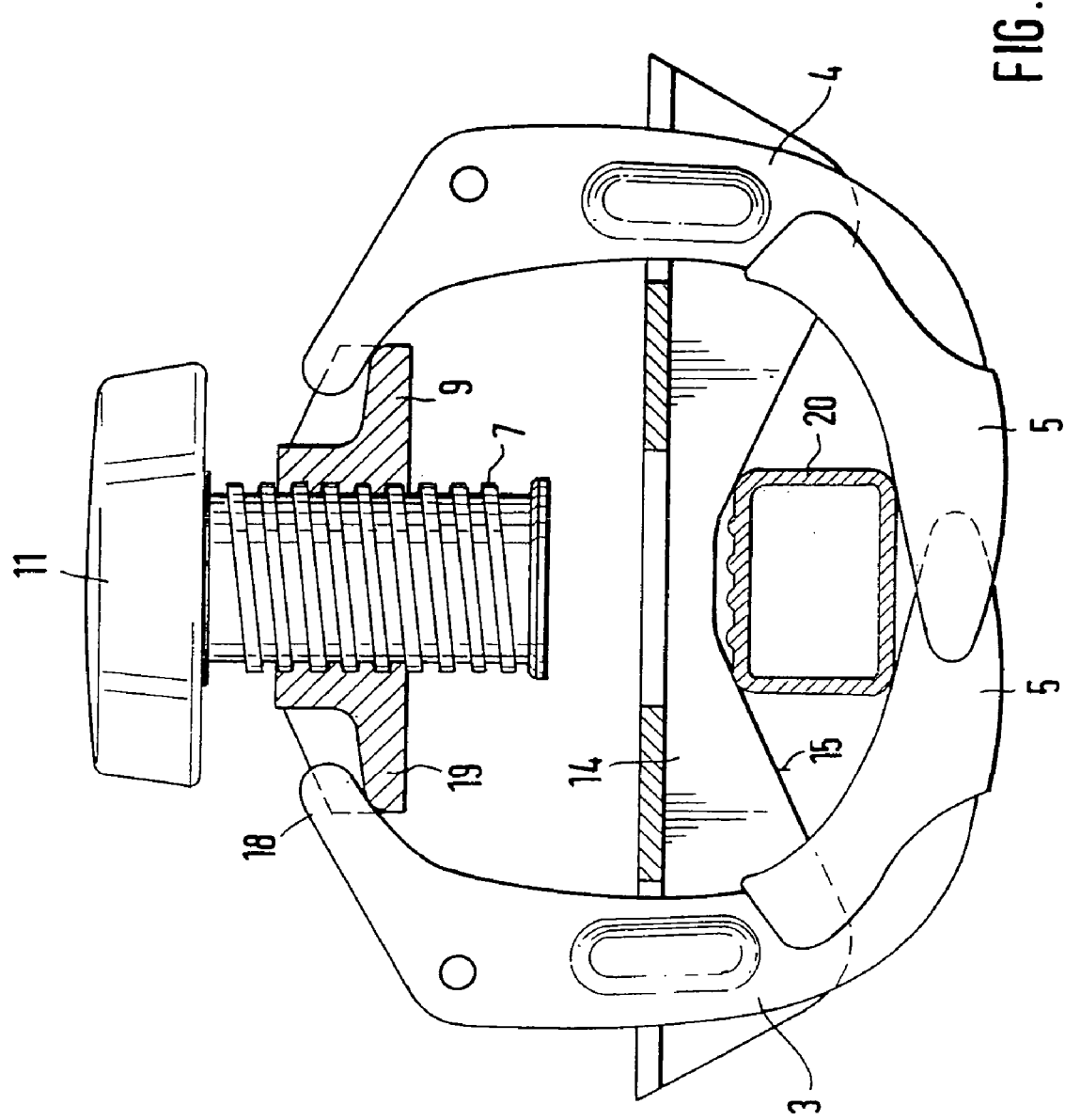

FIXING DEVICE FOR FASTENING A ROOF BOX

Figure 1:
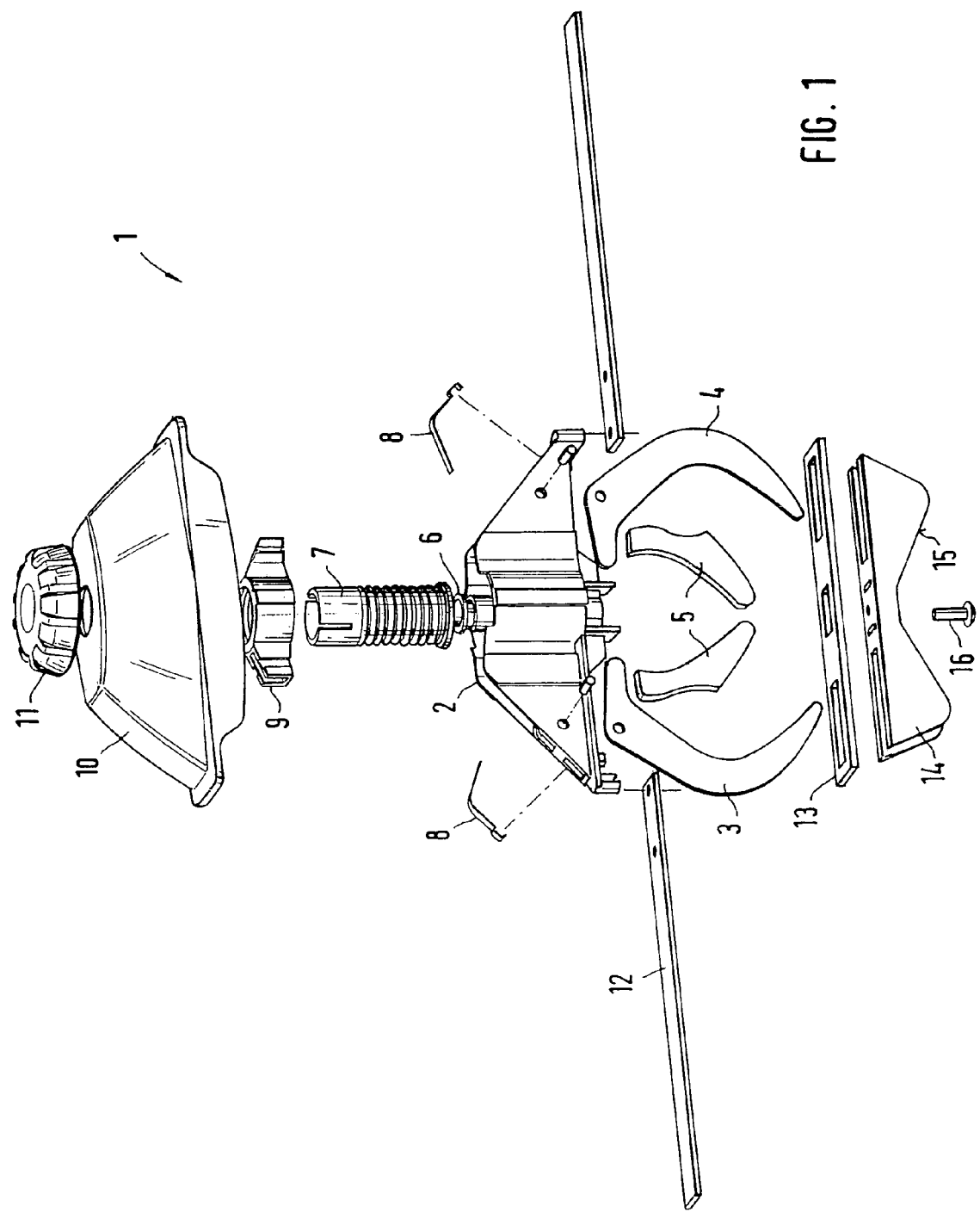

BACKGROUND OF THE INVENTION:

The invention relates to a fixing device for fastening a roof box on crossbars which are fastened to a vehicle roof, said fixing device comprising two-armed clamping jaws that extend through the bottom of the roof box and can be braced.

SUMMARY OF THE INVENTION:

A fixing device for fastening a roof box to a vehicle roof is known from EP 1 338 474 A1. This device has a mounting body arranged inside the roof box which has openings for L-shaped connecting means. These connecting means are held in an actuating element which has an exterior thread which interacts with a corresponding interior thread of a control grip. Proceeding from the locked position, the actuating element screws into the control grip when the control grip is turned, as a result of which the L-shaped hooks are first of all vertically lowered. The translational motion is overlapped with a swivelling motion by the special design of the openings of the mounting body, so that the hooks swing apart. The swivel motion is always coupled with the translational motion by this forced guidance. To avoid jamming during locking or unlocking, the movable parts must be made with a relatively large play, so that the impression of a wobbly construction is produced. A further disadvantage can be seen in that the hooks are expensive stamped bent parts whose load capacity is limited in wide and high roof carriers.

Therefore, the object of the invention is to provide a fixing device for fastening a roof box which is built so as to be sturdy and enables a reliable locking and unlocking.

To solve this object in a fixing device of the aforementioned type, it is provided according to the invention that the clamping jaws are mounted on a support base fixed in the interior of the roof box in a manner so as to pivot about a stationary swivel axis and that interior end sections of the clamping jaws rest against a stop element which is vertically displaced by rotating an actuating element in order to move the clamping jaws by a pure swivelling motion between a locked and an unlocked position.

The fixing device according to the invention is constructed in such a way that the two-armed clamping jaws are swivel-mounted on the support base. Accordingly, when the fixing device is actuated, the clamping jaws perform a pure swivel or rotary motion about their swivel axis. Since the clamping jaws always rest against the support base with their interior end sections, the entire mechanism is free from play, as a result of which a reliable support of the roof box on the crossbars is ensured. By turning the actuating element, the clamping jaws are swung together or apart in order to lock or unlock the roof box.

The stop element of the fixing device according to the invention can preferably have a thread which interacts with a complementary thread of a stationary screw element connected with the actuating element and displaces the stop element vertically when the actuating element is turned. When turning the actuating element, the stop element is moved up or down as on a spindle. Since the end sections of the clamping jaws rest against the stop element, the upwardly or downwardly directed movement of the stop element leads to a swivelling of the clamping jaws.

An especially good function of the fixing device can be obtained if the screw element is essentially cylindrical or tubular and has an external thread which interacts with an internal thread of the stop element. The screw element is connected with the actuating element and can be pivoted in or on the support body, so that turning the actuating element causes the external thread of the screw element to turn. The screw element can be supported on a guide in or on the support base which is preferably configured as a pin on which the screw element can be placed. When turning the actuating element, the screw element connected with it remains in its position since it can only be turned. On the other hand, the stop element interacting with the screw element via its internal thread is moved vertically when turning the screw element.

A further improvement can be obtained in that one or each clamping jaw is acted upon by a spring element which presses the interior end section of the clamping jaw against the stop element. Since the force of the spring element acts on the clamping jaw in every position, the locking and unlocking takes place free from play. The outer ends of the clamping jaws are permanently held in the open position by the spring elements, the interior end sections of the clamping jaws resting against the stop element. In this way, the clamping jaws are automatically opened as far as possible, as a result of which the mounting of the fixing device is facilitated. Preferably, the spring element is in the form of a leaf spring. The spring element can be braced on the support base or at another point as long as it is ensured that the clamping jaws are pressed against the stop element by the spring element.

It is also within the scope of the invention that the clamping jaws be provided with a lining. Preferably, this lining consists of plastic which surrounds the metal clamping jaws and protects the surface of the crossbars.

According to a further embodiment of the invention, it can be provided that the clamping jaws are arranged in parallel planes and are movable. Preferably, both clamping jaws are moved by a specific degree parallel and opposite to one another, the displacement corresponds at least to half of the thickness of the clamping jaws in each case. This makes it possible to move the clamping jaws past one another when the fixing device is being locked and to lie adjacent to one another in the locked position. In this way, the transmitted forces are distributed over both clamping jaws.

In a further embodiment of the invention, it is provided that a centering element which is arranged, or can be arranged, outside of the roof box is provided which can be set against the crossbars that are fastened on the roof of the vehicle and which centres the crossbar during locking. Advantageously, the centering element has contact surfaces which form an almost concave receptacle for the crossbars. The centering element is connected with the support base and, when installed, is located on the underside of the roof box. When the fixing device is locked, the diagonally extending contact surfaces automatically result in a centering of the fixing device on the crossbars.

Furthermore, the invention relates to a roof box for fastening on crossbars attached to a vehicle roof. The roof box is characterized in that it has at least one, preferably four, fixing devices of the described type. The individual fixing devices are connected with the bottom of the roof box via snap connections.

Further advantages and details of the invention are described in greater detail by means of an embodiment with reference to the figures. The figures are schematic illustrations.

Figure 2:
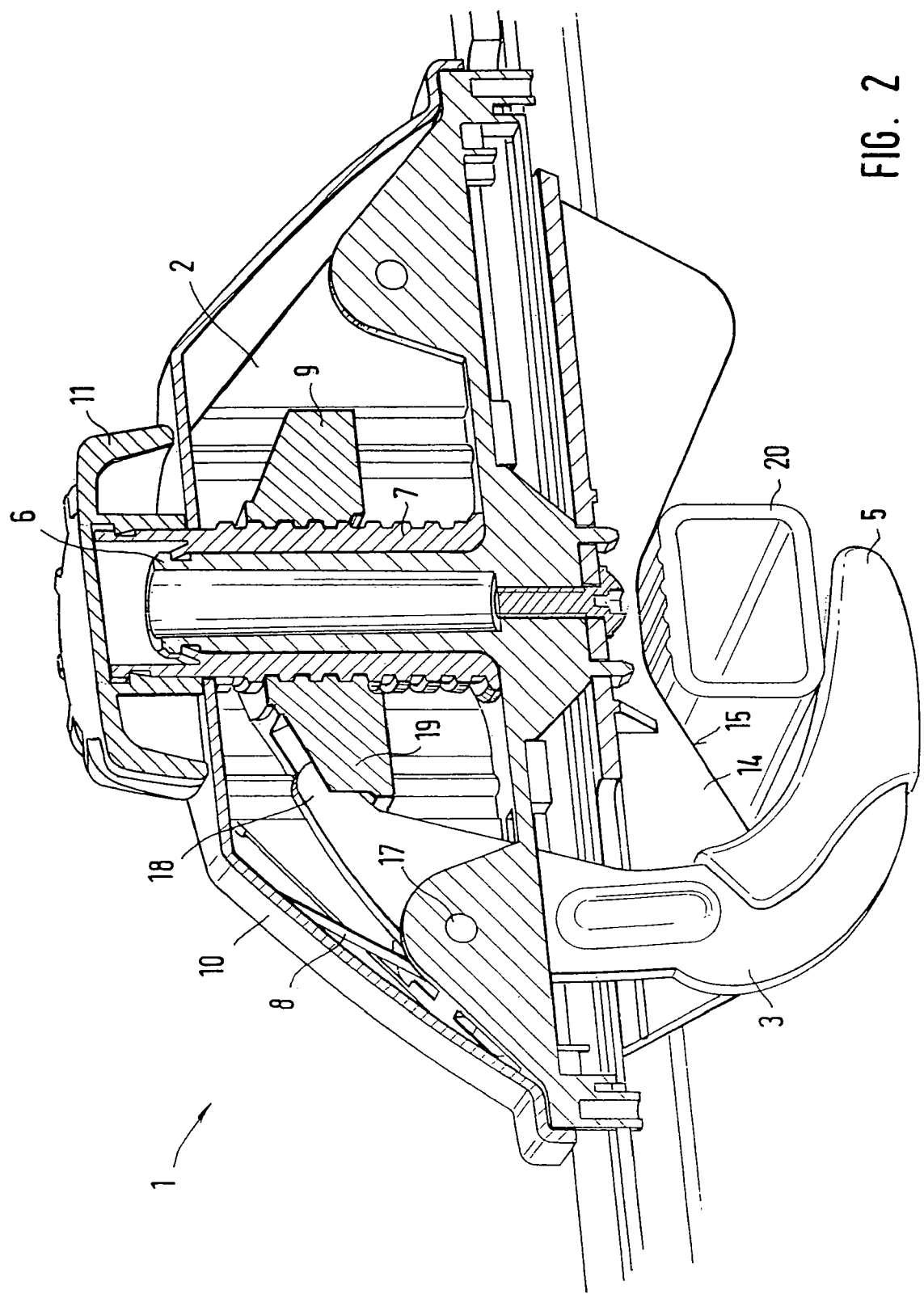
Figure 3:
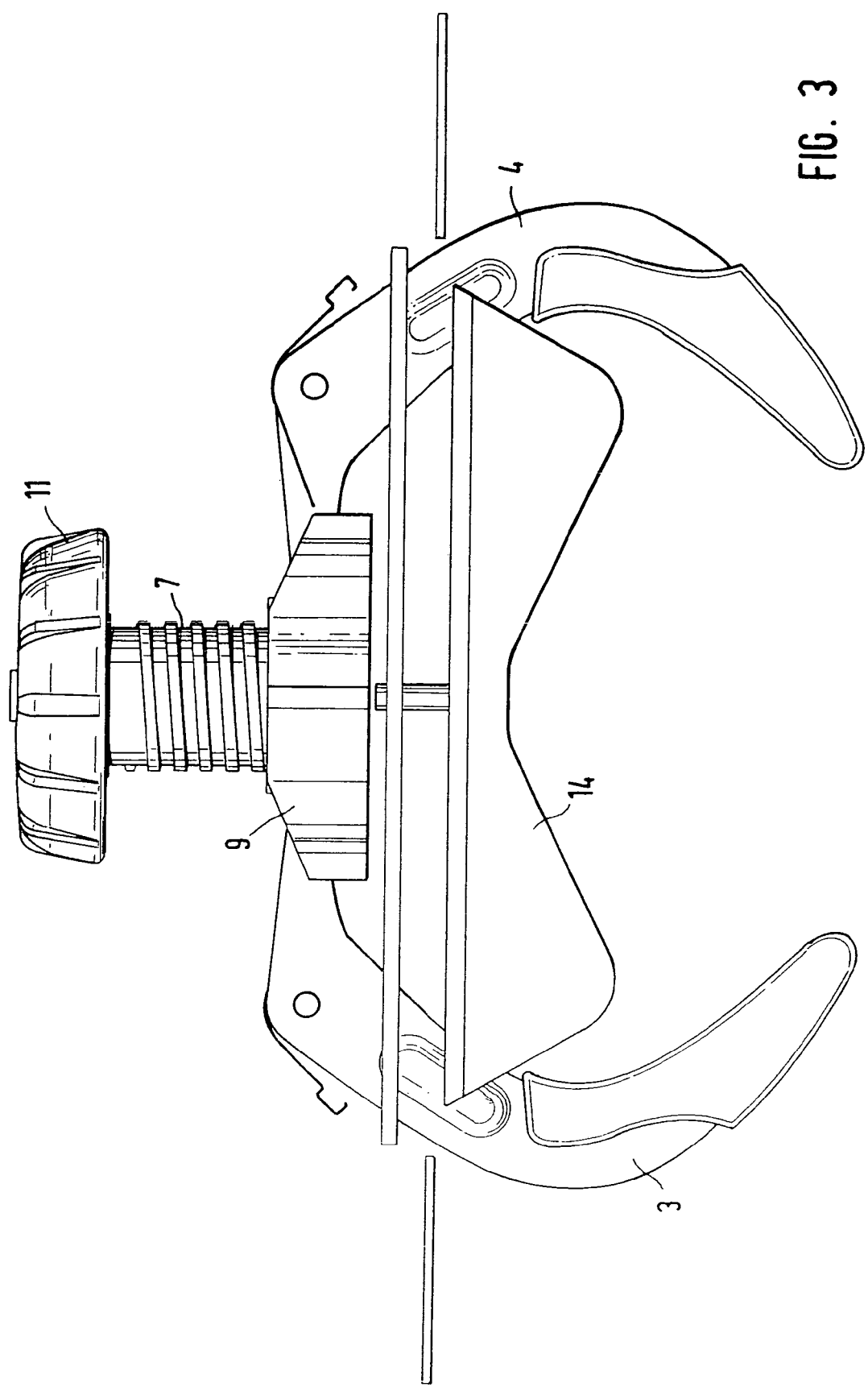

DESCRIPTION OF THE PREFERRED EMBODIMENTS:

FIG. 1 an exploded drawing of an embodiment of the fixing device according to the invention;

FIG. 2 a sectional view of the fixing device of FIG. 1;

FIG. 3 a view of the essential parts of the fixing device in the unlocked position; and FIG. 4 the fixing device shown in FIG. 3 in the locked position.

The fixing device 1 shown in FIG. 1 consists of a support base 2 on which two-armed clamping jaws 3, 4 are swivel-mounted. The clamping jaws 3, 4 are crescent-shaped and are pivoted on the support base 2 by bolts. The clamping jaws 3, 4 which are made of metal, preferably of steel, have plastic linings 5 on their ends lying outside of the roof box. The clamping jaws 3, 4 are stamped parts and can be produced in a cost-efficient manner.

The support base 2 has an essentially trapezoidal form and is made partially hollow. The central part of the support base 2 has a tubular pin 6 which is used to support a screw element 7 which is freely rotatable on the pin 6. In the region of the two lateral, tapering end sections of the support base 2, spring elements, each in the form of leaf springs 8, are provided which are braced with their one end on the support base 2 and rest with their other end on the upper surfaces of the clamping jaws 3, 4 and press them against a stop element 9 by spring tension.

The stop element 9 has an internal thread which is adapted to the external thread of the screw element 7, so that the stop element 9 can be screwed onto the screw element 7. With screw element 7 inserted in the support base 2, the stop element 9 can be moved in the free space inside the support base 2. The stop element 9 has two lateral, opposite stop surfaces, the end sections of the stop element 9 are essentially U-shaped. The interior end sections of the clamping jaws 3, 4 ab which are pressed against the stop element 9 by the leaf springs 8 are braced on these stop surfaces.

Furthermore, a housing 10 is shown in FIG. 1 which consists of an upper and a lower housing part that can essentially be fastened inside a roof box. Above the housing 10, a control grip 11 is shown as actuating element which, when mounted, is connected with the screw element 7 so as to be stationary.

Furthermore, FIG. 1 shows a sealing strip 12, a rubber seal 13, which seals the fixing device toward the outside of the roof box and serves as spring element, as well as a centering element 14. The centering element 14 has contact surfaces 15 which extend diagonally to one another and can be placed against the crossbars of the vehicle roof. The diagonal contact surfaces 15 of the centering element 14 effect an automatic centering of the fixing device 1 when locking. A screw 16 is used to fasten the centering element 14 to the support base 2.

FIG. 2 shows a sectional view of the fixing device of FIG. 1. In this view, only the clamping jaw 3 is shown for a better overview, the other clamping jaw 4 can be symmetrically moved. It can be seen in the drawing of the assembly in FIG. 2 that the screw element 7 is swivel-mounted on the pin 6 of the support base 2. The external thread of the screw element 7 and the internal thread of the stop element 9 engage in one another, so that the stop element 9 can be vertically shifted along the axis of the thread when the control grip 11, which is firmly connected with the screw element 7, is turned. When the control grip 11 is turned clockwise, the stop element 9 is moved upward, when it is turned counterclockwise, the stop element 9 is moved downward. These movements are limited when the stop element 9 abuts with its upper side against the inner surface of the housing 10 or with its lower side against the bottom of the support base 2.

The clamping jaw 3 is swivel-mounted in the support base 2 via a bolt 17. The end section 18 of the clamping jaw 3 inside the housing 10 is in contact with the U-shaped lateral end section 19 of the stop element 9. The prestressing of the leaf spring 8 causes the clamping jaw 3 to press against the stop element 9 in every position. Accordingly, the outer free end of the clamping jaw 3 permanently undergoes a force that presses outward.

It is also shown in FIG. 2 that the contact surfaces 15 of the centering element 14 rest against a crossbar 20. The crossbar 20 has two contact points or contact surfaces with the centering element 14 and two contact points or surfaces with the lining 5 of the clamping jaws 3, 4.

The individual parts of the fixing device 1 are connected to one another by snap connections, the fixing device 1 is screwed together with the bottom of a roof box or fastened to the bottom via a snap connection.

FIG. 3 is a view of the essential parts of the fixing device in the unlocked position. In this view, the support base is not shown. This stop element 9 is located in its lowermost position, the clamping jaws 3, 4 contacting the stop element 9 are in the maximum open position. In this position, the fixing device 1 fastened to the roof box can be easily mounted on the crossbars of the vehicle. The control grip 11 can then be turned clockwise, so that the stop element 9 is moved vertically upward along the screw element 7. When the stop element 9 is moved, the clamping jaws 3, 4 are moved along with it and turned about their center of rotation, so that they are closed.

FIG. 4 shows the view of the fixing device 1 shown in FIG. 3 in the locked position. The stop element 9 is now in its uppermost position, the clamping jaws 3, 4 have been swung accordingly toward one another, so that the outer ends of the clamping jaws 3, 4 lie behind one another and can completely surround the crossbar.

The stop element 9 and the support base 2 are configured such that the two clamping jaws 3, 4 are arranged and moved in parallel planes. Consequently, when locked, the clamping jaws 3, 4 can be moved so far until they lie adjacent to one another.

The invention claimed is:

1. Apparatus for fastening a roof box to crossbars fastened to a vehicle roof, comprising a roof box having a bottom, a fixing device having two-armed clamping jaws that extend through the bottom of the roof box and can be braced, the clamping jaws being mounted on a support base fixed in the interior of the roof box in a manner so as to pivot about a stationary swivelling axis and interior end sections of the clamping jaws rest against a stop element which is vertically displaced by rotating an actuating element in order to move the clamping jaws between a locked and an unlocked position by a pure swivel motion.

2. Apparatus according to claim 1, wherein the stop element has a thread which interacts with a complementary thread of a screw element which is connected with the actuating element so as to be stationary and displaces the stop element vertically when the actuating element is turned.

3. Apparatus according to claim 2, wherein the screw element is essentially cylindrical or tubular and has an external thread which interacts with an internal thread of the stop element.

4. Apparatus according to claim 2 or 3, wherein the screw element is swivel-mounted in or on the support base.

5. Apparatus according to claim 1, wherein one or each clamping jaw is acted upon by a spring element which presses the interior end section of the clamping jaw against the stop element.

6. Apparatus according to claim 5, wherein the spring element is in the form of a leaf spring.

7. Apparatus according to claim 5 or 6, wherein the spring element is braced on the support base.

8. Apparatus according to claim 1, wherein the clamping jaws are provided with a lining comprising plastic.

9. Apparatus according to claim 1, wherein the clamping jaws are arranged and movable in parallel planes.

10. Apparatus according to claim 1, wherein a centering element is provided which is arranged, or can be arranged, outside of the roof box, and can be placed on the crossbars fastened to the vehicle roof and which centers the crossbars when they are being locked.

11. Apparatus according to claim 10, wherein the centering element has contact surfaces which form an almost concave receptacle for the crossbars.

12. Apparatus according to claim 1, wherein the actuating element is in the form of a control grip.

13. Apparatus according to claim 1, comprising a housing which covers the support base at least partially.

14. Apparatus according to claims 2 or 3, wherein the screw element is swivel mounted in or on the support base on a guide in the form of a pin.

15. Apparatus for fastening to crossbars fastened to a vehicle roof, comprising a roof box having a bottom, a plurality of fixing devices, each of said fixing devices comprising two-armed clamping jaws that extend through the bottom of the roof box and can be braced, the clamping jaws being mounted on a support base fixed in the interior of the roof box in a manner so as to pivot about a stationary swivelling axis and interior end sections of the clamping jaws rest against a stop element which is vertically displaced by rotating an actuating element in order to move the clamping jaws between a locked and an unlocked position by a pure swivel motion.

* * * * *